US006539847B2

(12) United States Patent
Wong (10) Patent No.: US 6,539,847 B2
(45) Date of Patent: Apr. 1, 2003

(54) FOOD PROCESSING DEVICE

(76) Inventor: Yan Kwong Wong, Unit 1016-17, 10/F Metro Centre II 21 Lam Hing Street, Kowloon Bay, Kowloon (HK)

( * ) Notice: Subject to any disclaimer, the term of this patent is extended or adjusted under 35 U.S.C. 154(b) by 0 days.

(21) Appl. No.: 10/047,603

(22) Filed: Oct. 26, 2001

(65) Prior Publication Data

US 2002/0144606 A1 Oct. 10, 2002

(30) Foreign Application Priority Data

Oct. 26, 2000 (CN) ........................................ 00262656 U (51) Int. Cl.[7] .............................. A23N 1/02; A47J 43/06; B02C 18/18; B02C 25/00; A23L 1/00
(52) U.S. Cl. ............................. 99/492; 99/484; 99/495; 99/506; 99/508; 241/92; 241/93; 241/95
(58) Field of Search ........................ 99/484, 492, 495, 99/501–508; 241/92–95, 273.1, 273.2, 273.3, 273.4, 168, 169.1, 285.2, 285.3, 101.2

(56) References Cited

U.S. PATENT DOCUMENTS

| | | | | |
|---|---|---|---|---|
| 4,198,887 A | * | 4/1980 | Williams, Jr. | 83/592 X |
| 4,227,655 A | * | 10/1980 | Williams | 241/92 |
| 4,277,995 A | * | 7/1981 | Sontheimer | 83/592 X |
| 4,283,979 A | * | 8/1981 | Roakocy | 241/92 X |
| 4,331,300 A | * | 5/1982 | Hicks et al. | 241/282.1 |
| 4,369,680 A | * | 1/1983 | Williams | 99/510 X |
| 4,393,737 A | * | 7/1983 | Shibata | 241/282.2 X |
| 4,448,100 A | * | 5/1984 | Breeden | 241/92 X |
| 4,700,901 A | * | 10/1987 | McClean | 241/282.1 |
| 4,706,896 A | * | 11/1987 | Moon-Kau | 241/37.5 |
| 4,768,429 A | * | 9/1988 | Federighi | 99/623 X |
| 4,840,119 A | * | 6/1989 | Caldi | 99/513 X |
| 5,435,237 A | * | 7/1995 | Huang | 99/510 |

* cited by examiner

Primary Examiner—Timothy F. Simone
(74) Attorney, Agent, or Firm—Kenyon & Kenyon (57) ABSTRACT

A food processing device comprising a pan for receiving processed food and having an open top, a support plate for location on said open top of said pan, a plurality of food processing elements each for location on said support plate, a food holder mountable on said support plate for sliding movement thereon and optionally with a selected food processing element located therebetween, a hand guard for location on said food holder during a food processing operation, a basket for washing processed food and a storage container having an open top, whereby each of said support plate and said basket comprise two interconnected parts which are relatively movable between a first unfolded condition for use in a food processing operation and a second folded condition for storage when not in use, said open top of said storage container being shaped and dimensioned to receive and support said basket in its folded condition, said container and said basket then together defining sufficient storage space to snugly accommodate said pan, said support plate in its folded condition, said plurality of food processing elements and said food holder.

14 Claims, 7 Drawing Sheets

FOOD PROCESSING DEVICE

FIELD OF INVENTION

This invention relates to food processing devices, particularly to multipurpose food processing devices and even more particularly to folding multipurpose food processing devices.

BACKGROUND OF THE INVENTION

Conventional food processing devices have many parts that are often bulky and oddly shaped. As a result the device is difficult to store since they take up a lot of storage space.

Statement of Invention

According to the present invention, there is provided a food processing device comprising a pan for receiving processed food and having an open top, a support plate for location on said open top of said pan, a plurality of food processing elements each for location on said support plate, a food holder mountable on said support plate for sliding movement thereon and optionally with a selected food processing element located therebetween, a hand guard for location on said food holder during a food processing operation, a basket for washing processed food and a storage container having an open top, whereby each of said support plate and said basket comprise two interconnected parts which are relatively movable between a first unfolded condition for use in a food processing operation and a second folded condition for storage when not in use, said open top of said storage container being shaped and dimensioned to receive and support said basket in its folded condition, said container and said basket then together defining sufficient storage space to snugly accommodate said pan, said support plate in its folded condition, said plurality of food processing elements and said food holder.

Accordingly, the present invention provides a food processing device that can be packed away in a compact manner so that it is easy to store.

Preferably, during storage said food processing elements and food holder are located within said storage container, said support plate is located within one of said parts of the basket and said pan is located partly within said storage container and partly within the other of said parts of the basket.

Preferably, said plurality of food processing elements comprise slicing and grating cutters.

Preferably, the two parts of said support plate are hingedly connected together.

Preferably, the said support plate is provided with locking means comprising at least one locking pin and corresponding locking hole, the locking pin being insertable into the locking hole to secure the support plate in its unfolded condition.

Preferably, the two parts of said basket are hingedly connected together.

Preferably, the said basket is provided with engaging means comprising a groove located on one of said two parts and a tongue located on the other of said two parts, said tongue being engagable with said groove to secure the basket in its unfolded condition.

Preferably, means are provided on the outside of the storage container for supporting said hand guard.

Preferably, the said food holder comprises a base plate having downwardly depending flanges along two opposing edges, a ring extending upwardly from said base plate and located within said ring annular food accommodating means having an open base and a top provided with guide holes.

Preferably, the said food accommodating means is provided with downwardly extending needles and a plurality of slots are provided between said ring and said food accommodating means.

Preferably, the equipment further includes a food squeezer and support means are provided on the outside of the storage container for supporting said food squeezer.

Preferably, the said food squeezer comprises a hollow cone on the outer surface of which are arranged ridges, the inner diameter of the end edge of said cone being substantially equal to the outer diameter of said food accommodating means and said cone having a plurality of columns extending downwardly from its inner surface for sliding engagement within said guide holes of said food accommodating means.

Preferably, the said hand guard comprises an annular wall and a top having a plurality of downwardly extending columns for sliding engagement.

BRIEF DESCRIPTION OF THE DRAWINGS

An embodiment of the present invention is illustrated in the accompanying drawings, by way of example only, in which.

DETAILED DESCRIPTION OF INVENTION

Figure 1:
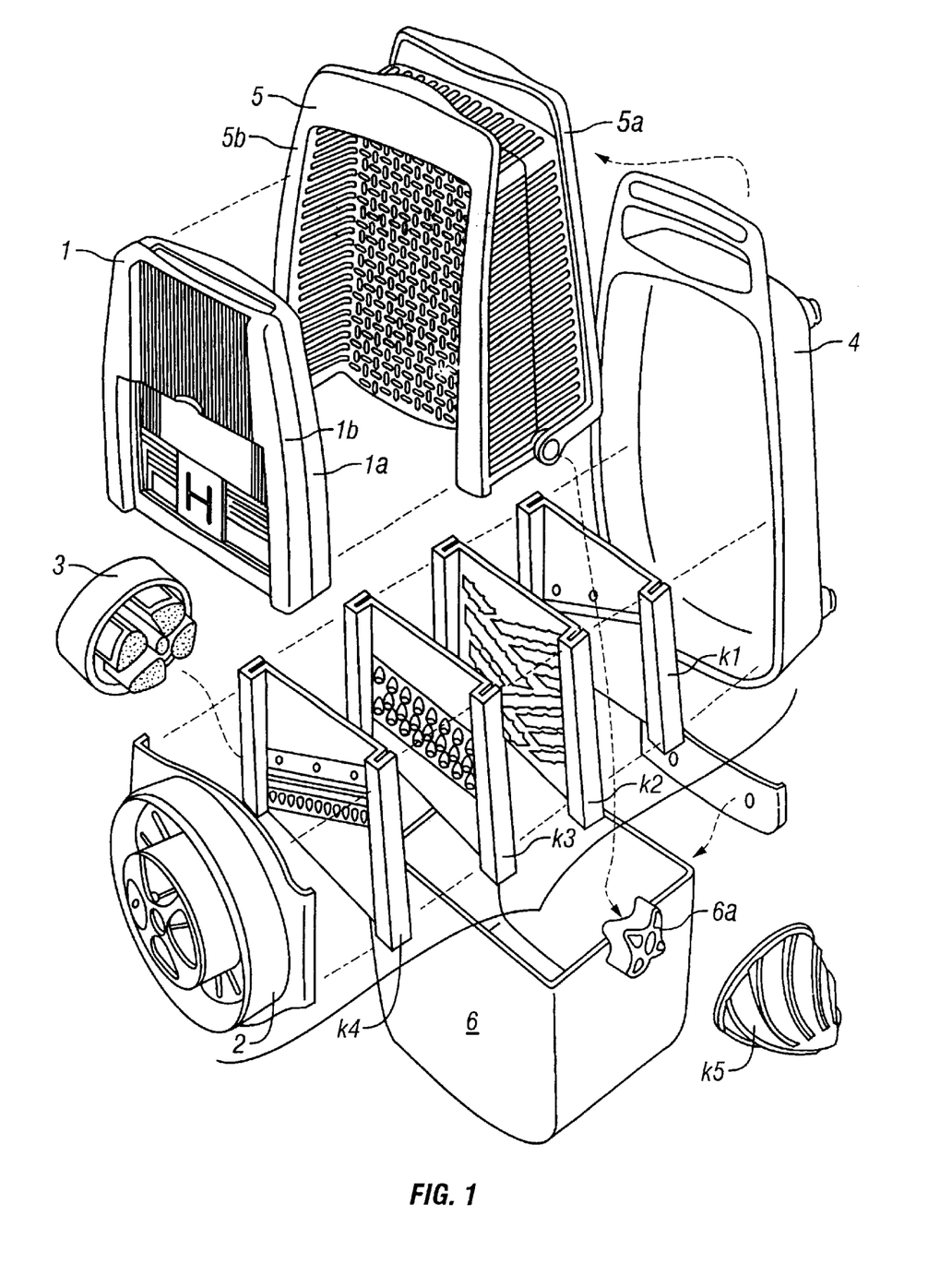
FIG. 1 is an exploded perspective view of the various parts of the food processing device of the present invention.

FIG. 1 of the accompanying drawings depicts all the requisite parts of the multipurpose food processing device to slice, grate, grind or squeeze food according to the present invention. The food processing device comprises a support plate 1, a food holder 2, a hand guard 3, a pan 4, a basket 5, a storage container 6 and a plurality of food processing means to slice, grate, grind or squeeze food K1–K5. Slicing blade K1 is suitable for slicing thin pieces of food, K2 is suitable for grinding or grating food, K3 is suitable for slicing filaments of food, K4 is a further slicing blade and K5 is a squeezer.

Figure 5:
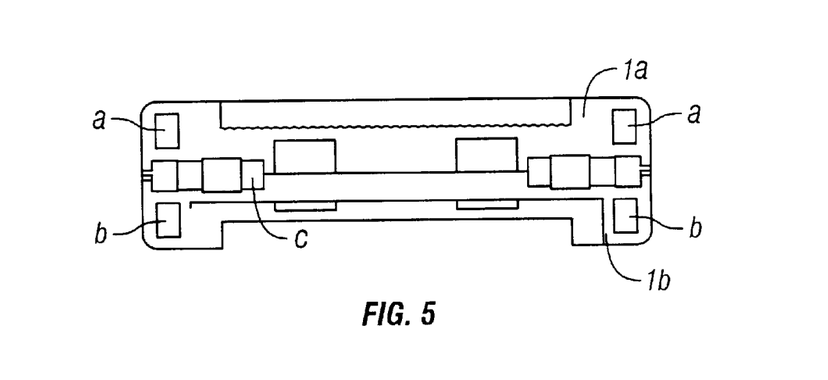
FIG. 5 is a plan view of the hinged end of the folded support plate of the food processing device shown in FIG. 1.
Figure 6:
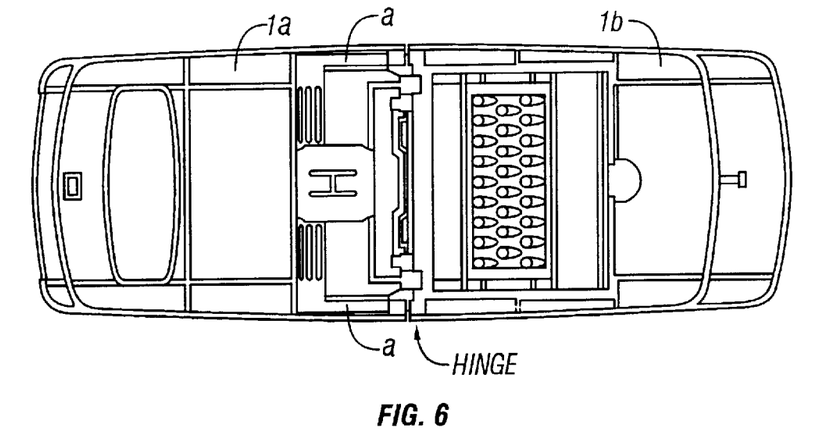
FIG. 6 is a plan view of the unfolded support plate of the food processing device as shown in FIG. 1 where the locking device is in an unlocked position.
Figure 7:
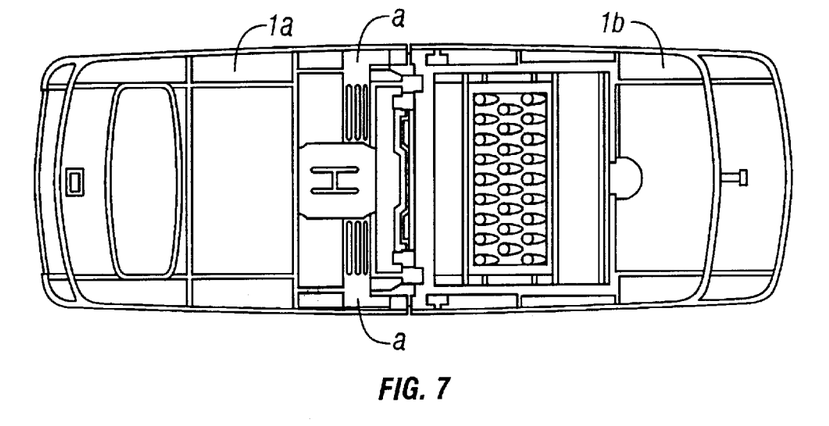
FIG. 7 is a plan view of the unfolded support plate of the food processing device as shown in FIG. 1 where the locking device is in a locked position.

The support plate 1 comprises two interconnected parts 1a, 1b that are hinged at point C (see FIG. 5) so the parts are relatively movable between an unfolded condition (see FIG. 6), and a folded condition (see FIG. 1). The support plate 1 is shaped so it can be mounted on the pan 4. The support plate 1 includes a blade holder 1c to hold a slicing, grinding or cutting blade K1–K4 in position. In the present embodiment a cutting blade K1–K4 is located in part 1b of the support plate 1. The support plate 1 is provided with locking means to secure the plate in its unfolded position. The locking means comprise at least one locking pin 'a' and at least one corresponding locking hole 'b' arranged on respective parts of the support plate 1. The present embodiment, as shown in FIGS. 5, 6 and 7, includes two locking pins 'a' incorporated within part 1a and two corresponding locking holes 'b' incorporated within part 1b. FIG. 6 shows the support plate 1 in its unfolded and unlocked state, whereas FIG. 7 shows the support plate 1 in its locked and unfolded state where the locking pins 'a' have been inserted into the corresponding locking holes 'b' to secure the plate 1.

Figure 12:
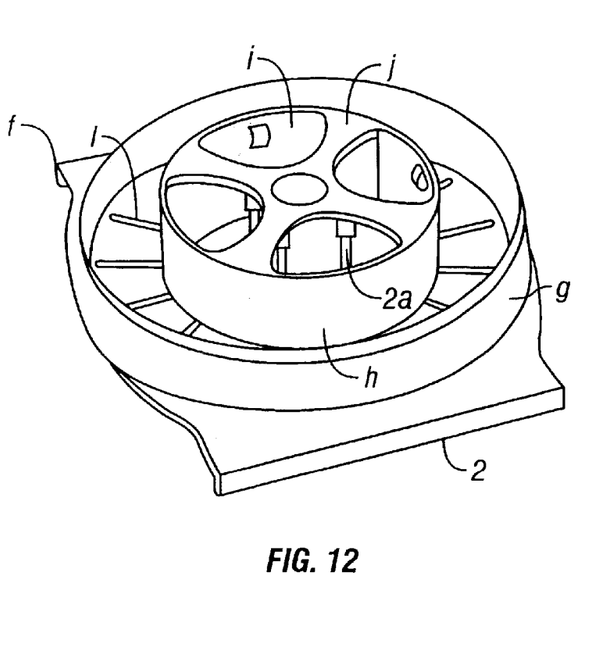
FIG. 12 is a perspective view of the food holder of the food processing device as shown in FIG. 1.

Food holder 2 as depicted in FIG. 12 comprises a base plate e with flanges f arranged on two opposing sides and extending downwardly. The distance between the inner sides of the flanges f is substantially equal to the outer edges of the support plate 1, so that the food holder 2 can be mounted on the support 1 and slide relative to it. The food holder is formed with annular food accommodating means h and an annular ring g whereby both extend upwards from the base plate e. The food accommodating means h are located within the annular ring g, have an open base and a top j provided with guiding holes i to receive food and guide it downwardly. Several radial slots 1 are arranged evenly on the base plate between the annular food accommodating means h and annular ring g.

Figure 13:
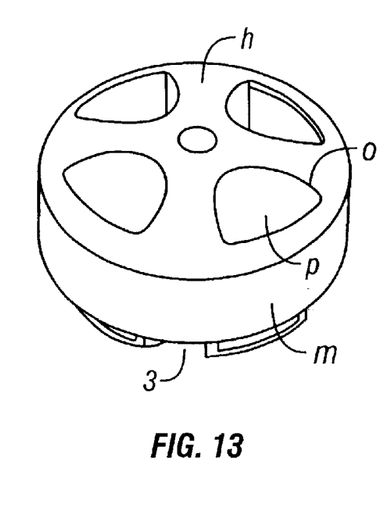
FIG. 13 is a perspective view of the hand guard of the present invention as shown in FIG. 1.

Hand guard 3 is used in conjunction with the food holder 2 when the food processing device is arranged to slice, grind or grate food. It is used to prevent the hands of the user from being in contact with the cutting blades. The hand guard 3 comprises an annular wall m, top n and a plurality of columns p. The columns p that extend downwardly from the inner wall of the top of the hand guard and are shaped and arranged so that they fit and slide into the guiding holes i of the food holder 2.

Pan 4 is shaped with an open top to receive the processed food.

Figure 8:
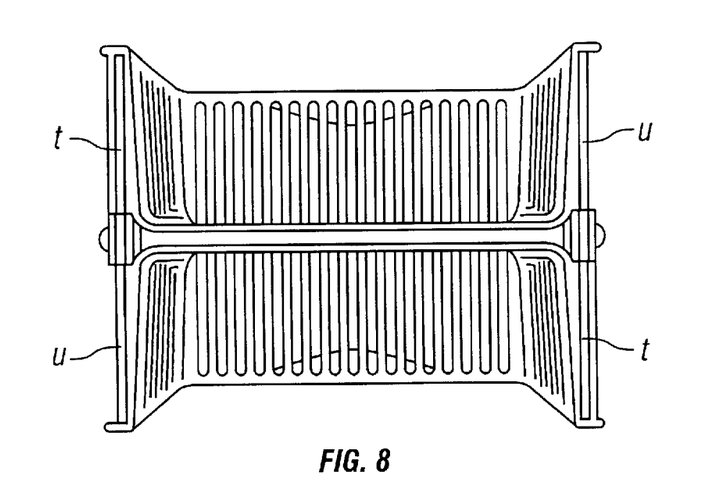
FIG. 8 is a plan view of the folded basket of the food processing device of as shown in FIG. 1.
Figure 9:
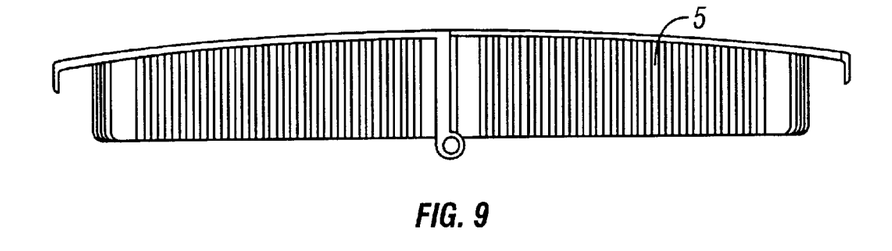
FIG. 9 is a side view of the unfolded basket of the food processing device as shown in FIG. 1.
Figure 10:
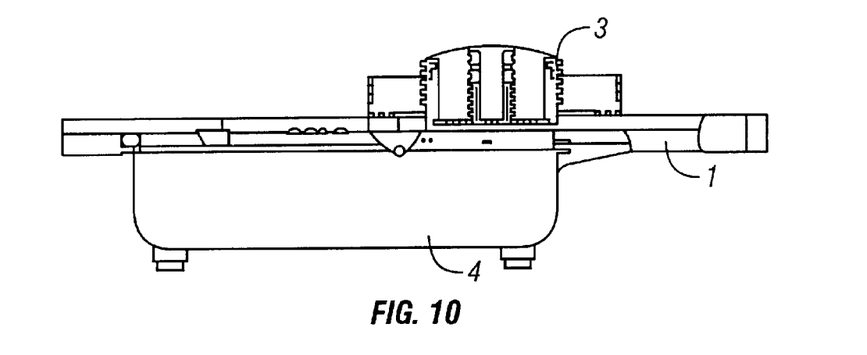
FIG. 10 is a sectional view of the present invention taken from line AA of FIG. 4.
Figure 11:
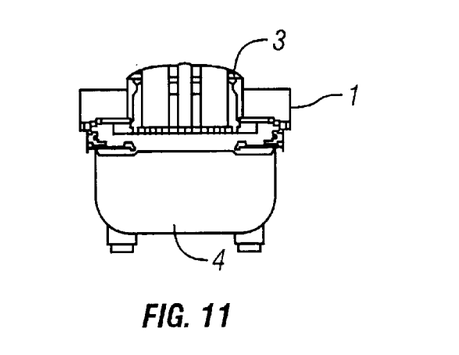
FIG. 11 is a sectional view of the present invention taken from line BB of FIG. 4.

Basket 5 is similar to the support plate 1 in that it also comprises two interconnected parts 5a, 5b that are hinged at point V so that the parts are relatively moveable between an unfolded condition (see FIG. 9) and a folded condition (see FIGS. 1 and 8). The basket 5 is used to hold the processed food as it is washed. It is formed with holes so that the water can drain away after washing. When the basket 5 is in the unfolded condition the two interconnected parts 5a, 5b are held together and in position using engaging means formed at the edges of the interconnecting parts 5a, 5b. The engaging means comprise a groove T located on one edge and a protruding tongue U located on a corresponding edge. When the basket is unfolded the grooves T engage with the protruding tongues U so that the interconnecting parts 5a, 5b are secured in position. When the basket 5 is in the folded position the two interconnected parts 5A, 5B form two recesses back to back.

The storage container 6 has an open top and is shaped and dimensioned to hold the support plate 1, food holder 2, pan 4, basket 5 and cutting blades K1–K4. Hanging brackets 6a, 6b are provided on the outside of the storage container 6 to support the hand guard 3 and squeezer K5 so that they are securely connected.

Figure 14:
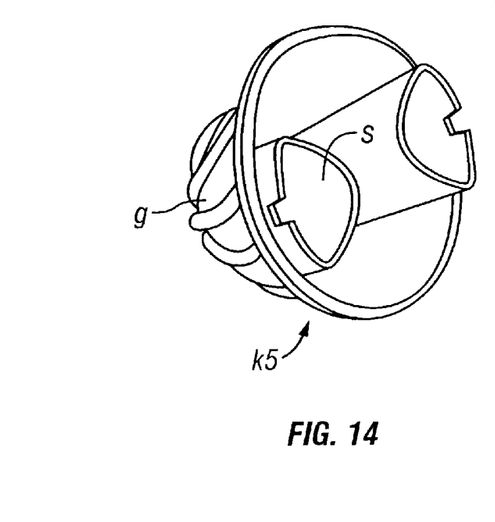
FIG. 14 is a perspective view of the squeezer of the food processing device as shown in FIG. 1.

The squeezer K5 as depicted in FIG. 14 comprises a hollow conical case g with evenly protruding spiral ridges formed on the outer surface. The inner diameter of the conical case is substantially equal to the outer diameter of the annular food accommodating means h so that the squeezer can be mounted on the food holder 2. A plurality of columns extend downwardly from the inner surface of the conical case g. As with the hand guard 3 They are shaped and arranged so that they fit and slide into the guiding holes i of the food holder 2.

Figure 2:
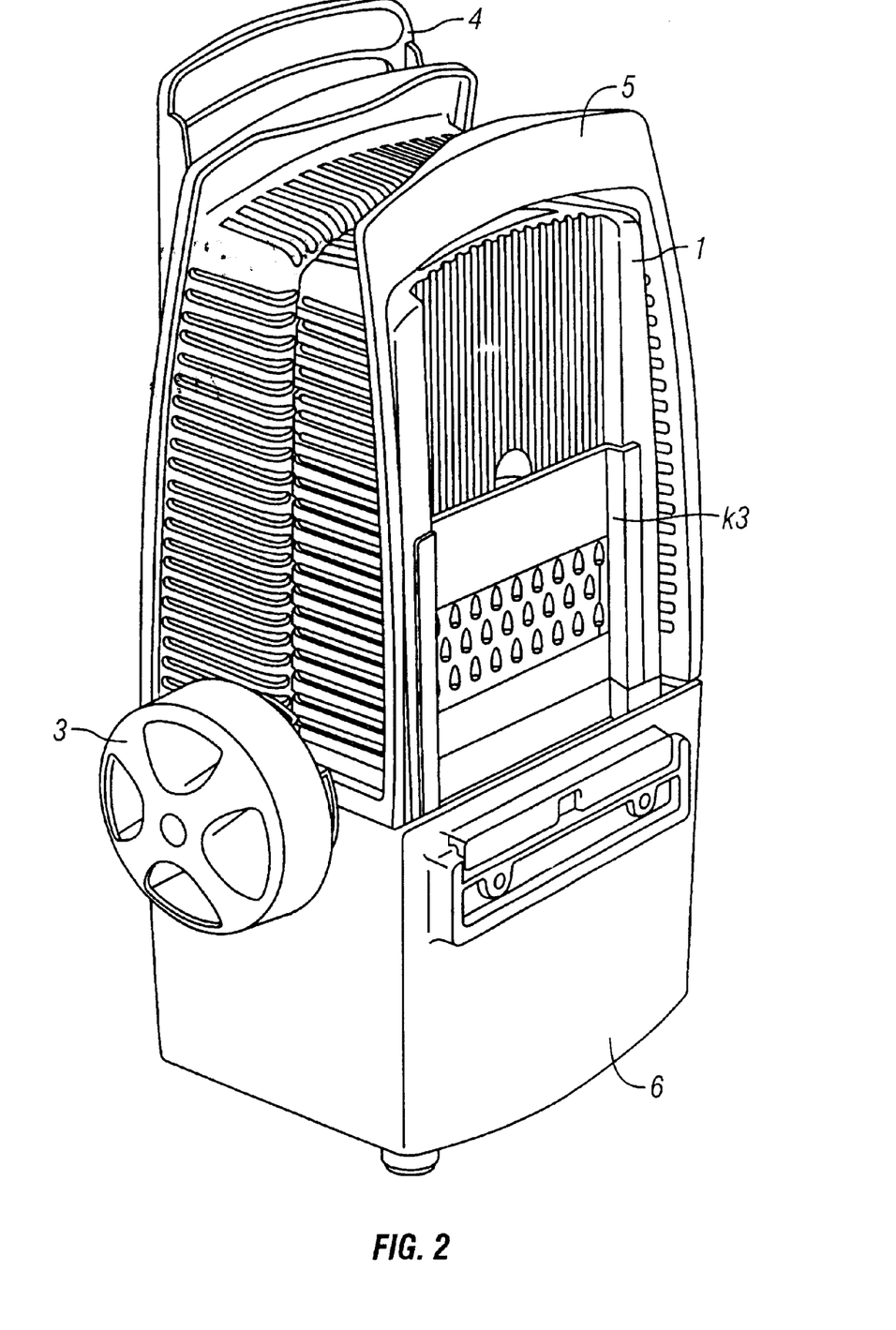
FIG. 2 is a perspective view of the food processing device as shown in FIG. 1 when packed away and ready to be stored.
Figure 3:
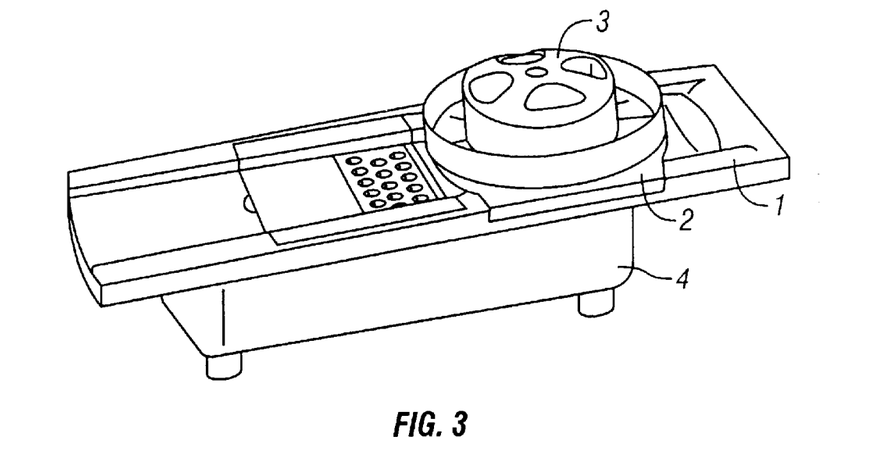
FIG. 3 is a perspective view of the food processing device as shown in FIG. 1 where the parts are assembled to slice, grind or grate food.
Figure 4:
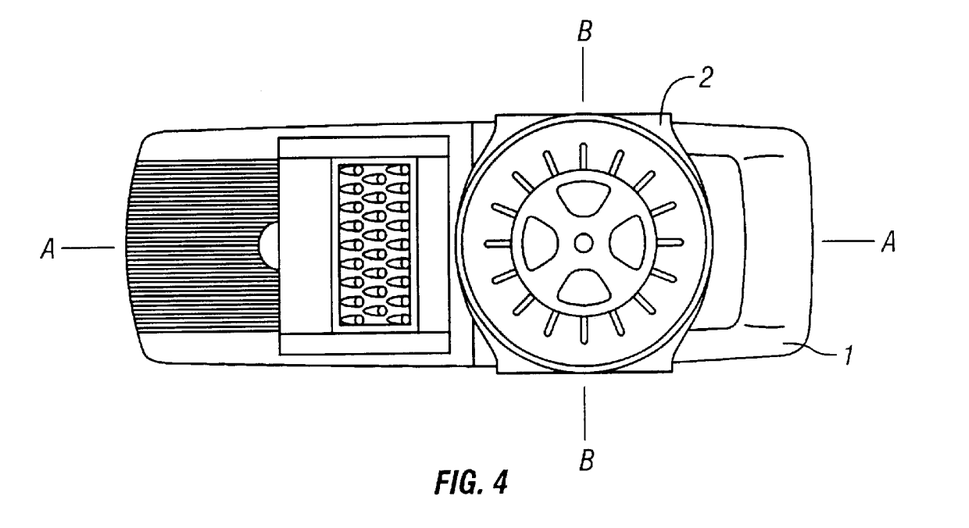
FIG. 4 is a plan view of the food processing device as shown in FIG. 1 where the parts are assembled to slice, grind or grate food.

FIG. 2 depicts food processing device packed away in a compact manner. The basket 5 and support plate 1 are folded so that the folded support plate 1 is received into one of the recesses of the basket. In the present embodiment the support plate is placed in the recess of interconnecting part 5b. The food holder 3, cutting blades K1–K4 and lower part of the pan 4 are placed in the storage container. The basket 5 and support plate 1 are then received in the opening of the storage container so that the upper part of the pan 4 extending from the storage container is received by the other recess of the basket 5; in this case the recess of interconnecting part 5a. The parts of the food processing device are snugly fitted together in a compact arrangement so that the device takes up a minimum amount of storage space.

FIGS. 3, 4, 10 and 11 depict the food processing device with the requisite parts assembled and arranged to slice, grind or grate food. In this case the food is processed in a sliding motion relative to the support plate 1 and pan 4. The slidable food holder 2 is mounted on the support plate 1 incorporating one of the cutting blades, which is in turn mounted on the pan 4. Food is placed within at least one of the guide holes i of the food holder 2. Then the hand guard 3 is mounted over the food holder and the protruding columns p push the food downward towards the support plate 1. Thus, the hand guard prevents the hands of the user from being in contact with the cutting blade. As the user of the device applies a pushing and pulling force to the food holder 3 it slides over the cutting blade in a to and fro motion and the food is sliced, grated or ground. The processed food then drops into the pan 4 below.

Figure 15:
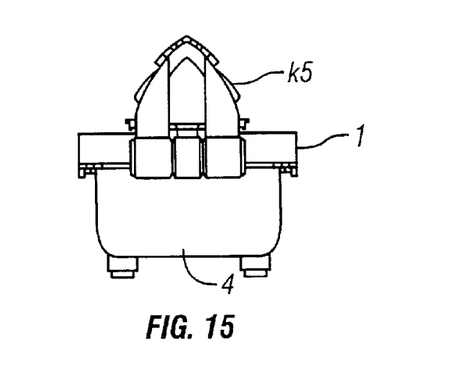
FIG. 15 is a sectional view of the food processing device as shown in FIG. 1 where the parts are assembled to squeeze liquid from food.
Figure 16:
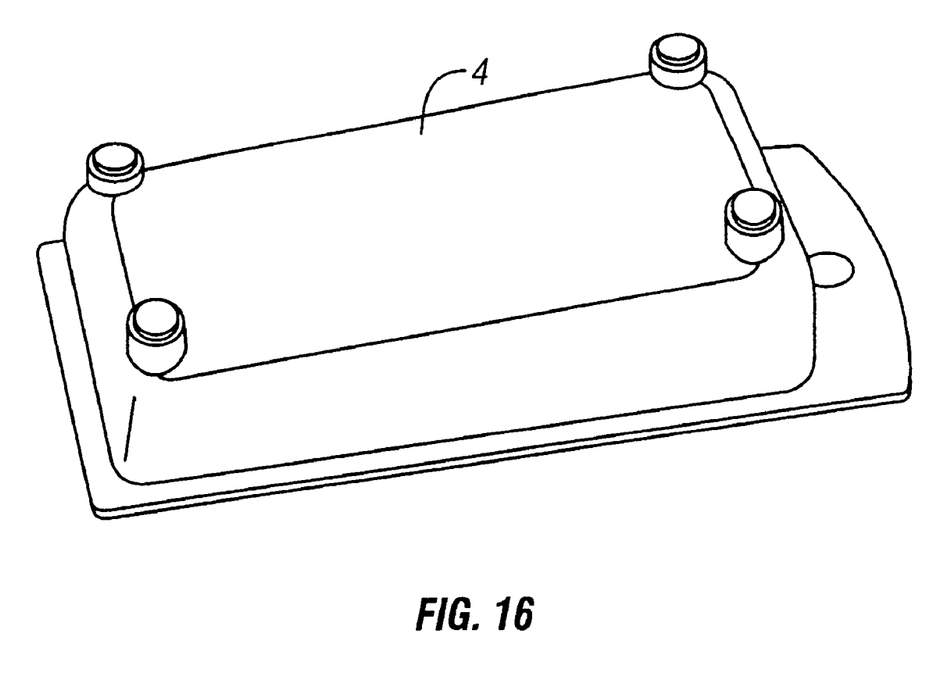
FIG. 16 is a perspective view of the underneath of the pan of the food processing device as shown in FIG. 1.

FIG. 15 depicts the food processing device with the requisite parts assembled and arranged to squeeze liquid from the food. The food holder 2 is mounted on the support plate 1, which is in turn mounted on the pan 4 as in the first embodiment. However, in this case the support plate 1 need not incorporate a cutting blade and squeezer K5 is attached to food holder 2. The food is placed on the conical case g of the squeezer and twisted to release liquid. The liquid released from the food runs through the slots 1 provided in the base plate e of the food holder 3 and into the pan 4 below.

It should be appreciated that the above described food processing device represents the preferred embodiments of the present invention. Various modifications may be made to the embodiment without departing from the scope of the present invention.

I claim:

1. Food processing device comprising:
   a pan for receiving processed food and having an open top;
   a support plate for location on said open top of said pan;
   a plurality of food processing elements each for location on said support plate;
   a food holder mountable on said support plate for sliding movement thereon and,
   optionally with a selected food processing element located therebetween;
   a hand guard for location on said food holder during a food processing operation;
   a basket for washing processed food; and
   a storage container having an open top;
   whereby each of said support plate and said basket comprise two interconnected
   parts which are relatively movable between a first unfolded condition for use in a food processing operation and a second folded condition for storage when not in use, said open top of said storage container being shaped and dimensioned to receive and support said basket in its folded condition, said container and said basket then together defining sufficient storage space to snugly accommodate said pan, said support plate in its folded condition, said plurality of food processing elements and said food holder.

2. Food processing device according to claim 1 wherein during storage said food processing elements and food holder are located within said storage container, said support plate is located within one of said parts of the basket and said pan is located partly within said storage container and partly within the other of said parts of the basket.

3. Food processing device according to claim 1 wherein said plurality of food processing elements comprise slicing and grating cutters.

4. Food processing device according to claim 1 wherein the two parts of said support plate are hingedly connected together.

5. Food processing device according to claim 1 wherein said support plate is provided with locking means comprising at least one locking pin and corresponding locking hole, the locking pin being insertable into the locking hole to secure the support plate in its unfolded condition.

6. Food processing device according to claim 1 wherein the two parts of said basket are hingedly connected together.

7. Food processing device according to claim 1 wherein said basket is provided with engaging means comprising a groove located on one of said two parts and a tongue located on the other of said two parts, said tongue being engagable with said groove to secure the basket in its unfolded condition.

8. Food processing device according to claim 1 wherein means are provided on the outside of the storage container for supporting said hand guard.

9. Food processing device according to claim 1 wherein said food holder comprises a base plate having downwardly depending flanges along two opposing edges, a ring extending upwardly from said base plate and located within said ring annular food accommodating means having an open base and a top provided with guide holes.

10. Food processing device according to claim 9 wherein said food accommodating means is provided with downwardly extending needles and a plurality of slots are provided between said ring and said food accommodating means.

11. Food processing device according to claim 10 wherein the equipment further includes a food squeezer and support means are provided on the outside of the storage container for supporting said food squeezer.

12. Food processing device according to claim 11 wherein said food squeezer comprises a hollow cone on the outer surface of which are arranged ridges, the inner diameter of the end edge of said cone being substantially equal to the outer diameter of said food accommodating means and said cone having a plurality of columns extending downwardly from its inner surface for sliding engagement within said guide holes of said food accommodating means.

13. Food processing device according to claim 9 wherein the said hand guard comprises an annular wall and a top having a plurality of downwardly extending columns for sliding engagement within said guide holes of said food accommodating means.

14. Food processing device according to claim 10 wherein the said hand guard comprises an annular wall and a top having a plurality of downwardly extending columns for sliding engagement within said guide holes of said food accommodating means.

* * * * *